W. S. SHIFFER.
POULTRY FEEDER.
APPLICATION FILED JULY 21, 1916.
1,200,892.
Patented Oct. 10, 1916.
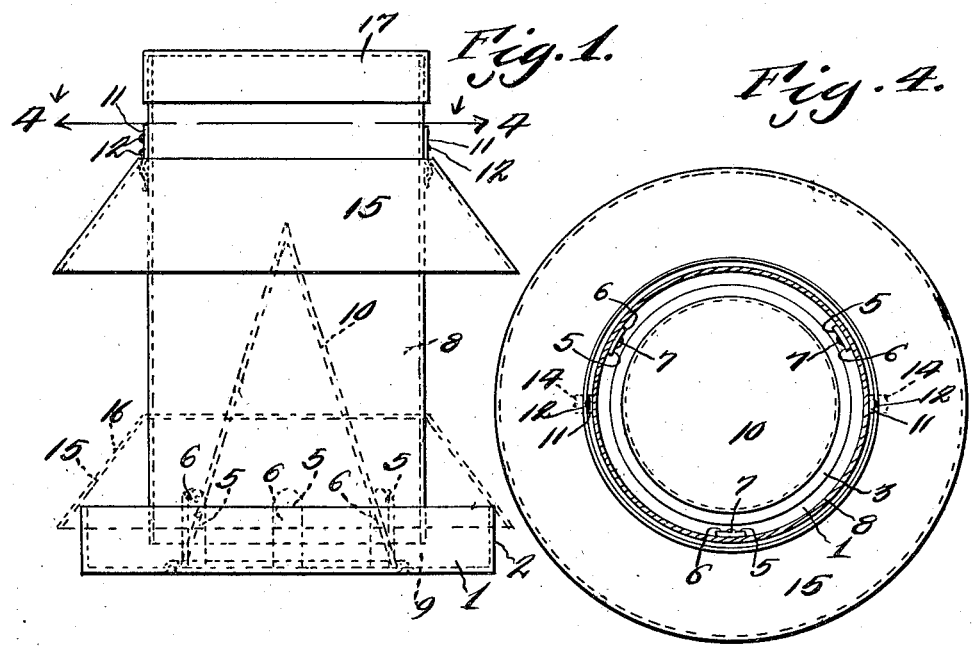
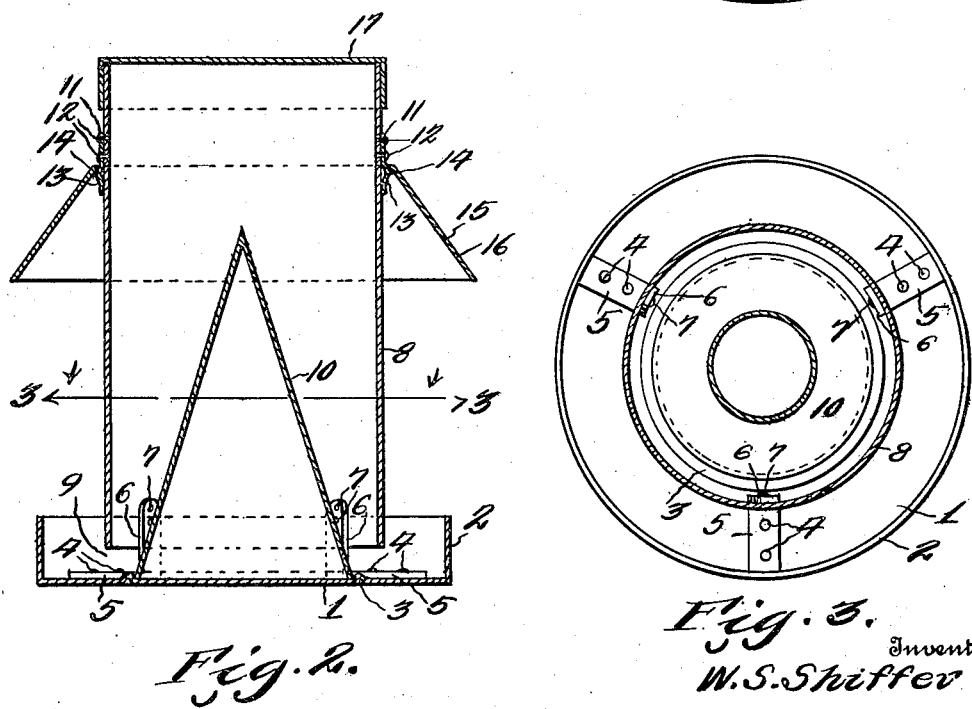
Witnesses
Inventor
W. S. Shiffer

UNITED STATES PATENT OFFICE.

WILLIAM S. SHIFFER, OF MANHEIM, PENNSYLVANIA.

POULTRY-FEEDER.

1,200,892.　　　　Specification of Letters Patent.　　Patented Oct. 10, 1916.

Application filed July 21, 1916. Serial No. 110,523.

*To all whom it may concern:*

Be it known that I, WILLIAM S. SHIFFER, a citizen of the United States, residing at Manheim, in the county of Lancaster, State of Pennsylvania, have invented a new and useful Poultry-Feeder; and I do hereby declare the following to be a full, clear, and exact description of the invention, such as will enable others skilled in the art to which it appertains to make and use the same.

This invention relates to an improved poultry feeder.

One of the objects of the invention is to provide a device of this nature comprising simple, improved, efficient and practical features of construction, all of which combine to efficiently supply feed to poultry, in such a manner as to prevent waste, as well as preventing the same becoming contaminated.

A further object of the invention is to provide a base trough having a cylinder of smaller diameter than the trough, spaced at intervals at the bottom of the trough, in combination with an annular rib or bead formed in the bottom of the trough, to hold a cone concentrically disposed with relation to the trough and the cylinder, to cause the feed to somewhat gradually feed toward the outer rim of the trough, as it is consumed by the poultry.

Another object of the invention is the provision of a cone member telescopically mounted upon the cylinder, and adapted to be lowered in contact with the upper edge of the outer flange of the trough, when the feed is not being consumed by the poultry, for instance, over night.

Another object of the invention is the provision of improved means for holding the cone-shaped cover in an elevated or raised position.

In practical fields the details of construction may necessitate alterations, falling within the scope of what is claimed.

The invention comprises further features and combination of parts, as hereinafter set forth, shown in the drawings and claimed.

In the drawings: Figure 1 is a view in elevation of the improved poultry feeder constructed in accordance with the invention. Fig. 2 is a vertical sectional view. Fig. 3 is a transverse sectional view on line 3—3 of Fig. 2. Fig. 4 is a transverse sectional view on line 4—4 of Fig. 1.

Referring more especially to the drawings, 1 designates a base trough, which is in the form of a pan having an upwardly extending annular flange 3, the bottom of this pan is formed with an annular shoulder or bead 3. Secured at 4 to the bottom of the pan trough are three angular brackets 5, the upwardly extending arms 6 of which are secured at 7 to the open ended cylinder 8, for supporting the same, so as to hold the lower end of the cylinder at a spaced interval 9 from the bottom of the trough or pan. A sheet metal hollow cone member 10 is provided, and its lower edge engages the bottom of the trough or pan, adjacent the shoulder or annular bead 3, which serves to hold the cone member 10 concentrically disposed with relation to the flange 2 and the cylinder 8, so that the feed, which is deposited in the cylinder 8, will feed from under the lower edge of the cylinder and toward the flange 2, and adjacent the lower exterior of the cylinder 8, where it is easily accessible to the poultry.

Adjacent the upper portion of the cylinder a plurality of plates 11 is secured as shown at 12, and which plates are provided with extensions 13, which are yieldable, and are bulged as shown at 14. A cone-shaped cover or hood 15 telescopically fits the cylinder 8. This cover or hood when in raised position as shown in full lines in Figs. 1 and 2, is supported by the bulges 14 of said extensions. However, when it is desired to lower the hood or cover, sufficient pressure may be applied to the hood, so as to cause its upper peripheral edge portion to bear against and depress the bulges of said extensions, thereby allowing the hood or cover to be moved below the extensions, so as to permit the wall at 16 substantially, to rest upon the upper edge of the flange 2 of the trough, thereby covering the feed over night, and prevent the same from becoming contaminated. The upper open end of the cylinder is provided with a closure 17, which is removable, when it is desired to fill the cylinder 8 with feed.

The invention having been set forth, what is claimed as new and useful is:—

A poultry feeder comprising a feed pan having an annular bead in its bottom concentric with the flange of the pan, a cylinder having its lower edge at a spaced interval from the bottom of the pan and being open ended and being of a diameter less than the diameter of the pan and greater than the diameter of the bead, means for so supporting the cylinder, a hollow sheet metal cone having its larger end engaging within the bead to hold the cone concentric with the flange of the pan and the cylinder, and extending into the cylinder, and a closure for the upper open end of the cylinder.

In testimony whereof I have signed my name to this specification in the presence of two subscribing witnesses.

WILLIAM S. SHIFFER.

Witnesses:
 IDA A. ENSMINGER,
 WIEN A. ENSMINGER.